July 20, 1943.  E. L. MEESON ET AL  2,324,942
GRINDING WHEEL DRESSING TOOL
Filed April 9, 1943
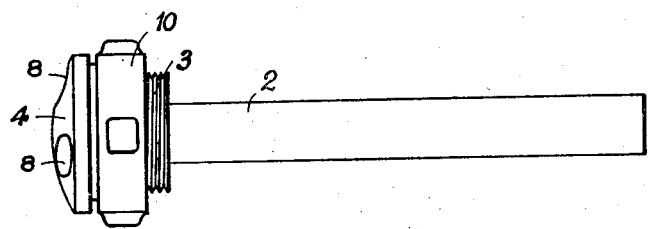
Fig: 1.
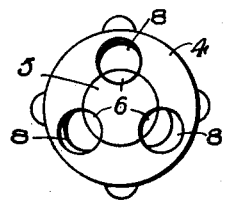
Fig: 2.
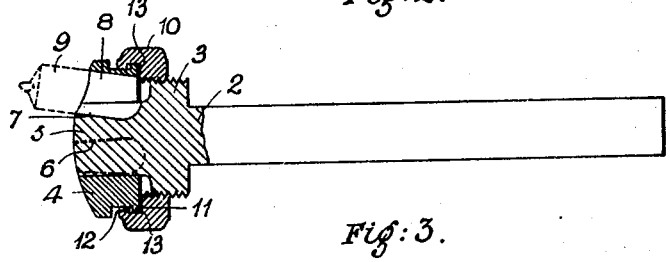
Fig: 3.
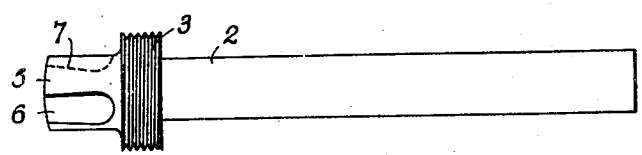
Fig: 4.
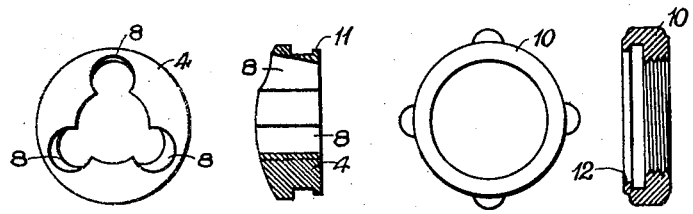
Fig: 5.  Fig: 6.  Fig: 7.  Fig: 8.
Inventors:
Edwin L. Meeson
John G. Meeson
by Babcock & Babcock
Attorneys Patented July 20, 1943

2,324,942

UNITED STATES PATENT OFFICE 2,324,942

GRINDING WHEEL DRESSING TOOL

Edwin Laurence Meeson and John Ivor Meeson, London, England

Application April 9, 1943, Serial No. 482,452
In Great Britain June 26, 1942

4 Claims. (Cl. 125—39)

This invention relates to tools for dressing the operative surfaces of grinding wheels and for other purposes, and has for its object to enable the effective portion of the tool to be readily changed as and when required from one definite and known angular position or rake to any of a plurality of other similarly known and definite positions.

According to the present invention the effective part of the tool, that is to say, the slug carrying the diamond or other cutting element or elements, is adapted to be firmly clamped in any one of a plurality of differently inclined positions in a holder by relative axial movement between the latter and a member carried thereby.

In the accompanying drawing,

Figures 1 and 2 are side and front views respectively of the improved tool.

Figure 3 is a view thereof partly in axial plane section.

Figure 4 is a detail view in side elevation of the shank and head of the tool holder.

Figures 5 and 6 are detail views in front elevation and axial plane section respectively of the axially movable member.

Figures 7 and 8 are similar detail views respectively of the locking member.

Referring to the construction shown in the drawing the tool comprises a holder 2, see Figure 4, having a screw-threaded head or flange 3, and a member 4, see Figures 5 and 6, which is carried loosely by a forwardly projecting central part 5 of the holder. The said part 5 is formed externally with a plurality of axially directed recesses 6, the bases 7 of which are inclined to the axis of the holder at different angles. The member 4 is formed internally with an equal number of similarly inclined axial recesses 8, the arrangement being such that when the said member 4 is engaged with the part 5 of the holder and the recesses in the one part registered with their respective counterpart recesses in the other part, a plurality of longitudinally divided sockets is formed having their axes at different inclinations to the axis of the holder.

The diamond-carrying slug 9, represented in dotted lines in Figure 3, can be firmly clamped in any one of said sockets by relative axial movement between the member 4 and the part 5 of the holder. This relative movement may be obtained by means of a ring nut 10, see Figures 7 and 8, screwing onto the head or flange 3 of the holder behind and in engagement with said member 4. For this purpose the rear edge of the member 4 and the forward inner edge of the nut 10 may be formed with interlocking flanges 11 and 12 respectively. Between the nut 10 and member 4 a washer 13 of fibre or other suitable material is arranged to absorb vibration and to prevent the intrusion of grinding grit between the nut and the head 3 of the holder. The nut is assembled on the member 4 by springing it over the flange 11 thereof.

As will now be understood rotation of the nut 10 in one direction or the other will cause relative axial movement between the member 4 and the part 5 of the holder in a direction to contract or expand the sockets and thereby clamp a slug inserted in any one of them firmly in position at an angle to the axis of the holder pre-determined by that of the socket in which it is inserted. In this way the angle or rake of the slug can be varied in a definite way and to a pre-determined degree.

We claim:

1. A tool of the character described comprising a stem having a head at one end, a member loosely mounted on said head, said head and member being each formed with an annular series of recesses around their outer and inner peripheries respectively, the recesses in the one part registering with those in the other part to form a series of divided sockets having their axes inclined at different angles to the axis of said stem, and means for imparting relative axial movement to said head and member for the purpose of clamping a diamond-carrying slug in any one of said sockets at a predetermined angle to the axis of said stem.

2. A tool of the character described comprising a stem having a head at one end, a member loosely mounted on said head, said head and member being each formed with an annular series of recesses around their outer and inner peripheries respectively, the recesses in the one part registering with those in the other part to form a series of divided sockets having their axes inclined at different angles to the axis of said stem, and a ring nut screwing onto said head and adapted on rotation to move said member relatively to said head in an axial direction for the purpose of clamping a diamond carrying slug in any one of said sockets at an angle to the axis of said stem pre-determined by that of said socket.

3. A tool for the purposes described comprising a stem and a head, said head being formed with an annular series of split sockets having their axes variously inclined to the axis of said stem, and each adapted to receive a diamond carrying slug, and means for contracting and expanding said sockets.

4. A tool for the purposes described comprising a stem and a head, said head comprising two concentrically arranged parts having a series of variously inclined grooves in their inner and outer peripheries respectively, the grooves in one part registering with those in the other part to form a series of divided sockets having their axes inclined at different angles to the axis of said stem and each adapted to receive a diamond-carrying slug, and means for imparting relative axial movement between said parts for the purpose of contracting and expanding said sockets.

EDWIN LAURENCE MEESON.
JOHN IVOR MEESON.